United States Patent [19]

Hillegonds et al.

[11] Patent Number: 4,470,660

[45] Date of Patent: Sep. 11, 1984

[54] BLIND MATING RACK AND PANEL FIBER OPTIC CONNECTOR

[75] Inventors: Clarence G. Hillegonds, Palm Bay; Luther P. Mills; William C. Stankos, both of Melbourne, all of Fla.

[73] Assignee: Harris Corporation, Melbourne, Fla.

[21] Appl. No.: 297,408

[22] Filed: Aug. 28, 1981

[51] Int. Cl.³ .............................................. G02B 7/26
[52] U.S. Cl. .............................................. 350/96.21
[58] Field of Search ............... 350/96.20, 96.21, 96.22

[56] References Cited

U.S. PATENT DOCUMENTS

| | | | |
|---|---|---|---|
| 4,185,886 | 1/1980 | Corrales | 350/96.21 |
| 4,198,122 | 4/1980 | Prunier et al. | 350/96.21 |
| 4,217,030 | 8/1980 | Howarth | 350/96.21 |
| 4,268,114 | 5/1981 | D'Auria et al. | 350/96.20 |
| 4,294,512 | 10/1981 | Logan | 350/96.20 |
| 4,405,201 | 9/1983 | Cefarelli et al. | 350/96.21 |
| 4,406,514 | 9/1983 | Hillegonds et al. | 350/96.21 |

FOREIGN PATENT DOCUMENTS 2611168  9/1977  Fed. Rep. of Germany ... 350/96.21

OTHER PUBLICATIONS

Cefarelli et al., "Optical Circuit Module Connector", IBM Tech. Discl. Bulletin, vol. 21, No. 4, Sep. 1978, pp. 1568-1570.

Primary Examiner—John D. Lee
Attorney, Agent, or Firm—Antonelli, Terry & Wands

[57] ABSTRACT

Blind mating of a rack and panel type fiber optic connector is accomplished by a course guide pin mounted within a connector mating block which is associated with a printed circuit board. The guide pin mates with a guide pin bushing provided in a chassis wall, thereby assisting in an initial nonangular movement of the conductors relative to one another and assisting in the parallel translation, as necessary, of a fiber-containing socket relative to a fiber containing connector pin. The floating part of the connector, specifically the socket, rides on a Teflon washer face and allows only lateral movement of the socket, so that there is effectively no or only minimal angular movement during the initial mating of the socket and the pin. Once the two have become initially mated, there is an accurate urging of the fiber optic pins together for extremely low loss abutment within the interior of the pin or jack portion of the rack and panel fiber optic connector.

34 Claims, 2 Drawing Figures

BLIND MATING RACK AND PANEL FIBER OPTIC CONNECTOR

FIELD OF THE INVENTION

The present invention relates to a rack and panel connector arrangement for optical fibers and is particularly directed to an optical fiber connector assembly for the blind joining, with low loss, of the ends of single optical fibers used in conjunction with opto-electronic, electro-optic circuit components provided on a printed circuit board, which are to be joined with optical fibers leading from the hardware mounting configuration by way of which the boards are retained in a rack, cabinet or like.

BACKGROUND OF THE INVENTION

With improvements in modular electronic and opto-electronic circuit components, there has developed the need for hardware coupling configurations which afford ease of assembly and minimal signal attenuation across interface points. For example, there are various types of electrode-connectors for coupling printed circuit boards or cards to cabinet or hardware mounting receptacles. Typically, on a printed circuit board, there is formed an intricate pattern of selectively plated or etched conductor which is joined to a considerably physically larger connector electrode arrangement which serves both to electrically connect the card with an interface port in the rack in which it is mounted and to provide actual physical support for the card in its housing. Where these printed circuit boards include electro-optic or opto-electronic components that require the need for optical communication highways such as optical fibers, additional connectors provided exclusively for the optical connections must be provided. Because of the characteristics of optical fibers and their associated optical signalling components, extremely precise coupling between components for minimizing signal loss is required and, in the past, has led to mechanical configurations which are complicated, bulky or hinder the physical handling, namely the insertion and removal, of the printed circuit card or module from the support housing in which it is retained.

FIG. 1 illustrates the general mounting of a printed circuit board 8 that contains a plurality of electronic components 7 that may be joined with one another by way of a selectively etched or plated conductor highway pattern on the surface of the printed circuit card, to a bulkhead type of connector. Printed circuit board 8 may include one or more electro-optic or opto-electronic components 6 electrically coupled to the conductor highway pattern and optically associated with one or more fiber coupling portions 1 each of which contains an individual optical fiber strand or pigtail. The hardware interfacing of the conductor highways on the card to the outside world is usually achieved by a connector 5 physically attached to one end of the card. Such a connector may include a plurality of conductive pins that are electrically joined to the conductor highways on the card and which have a physical configuration such that they couple to an associated plural pin connector mounted to a rack or panel wall 100 in the housing which contains the card 8. The pins of the connector that are mounted in the bulkhead are attached to the wires of the electrical cable which extends exteriorly of the housing. In this fashion, the printed circuit card connector performs a pair of functions: on the one hand, it provides a conductor hardware interface between the components which are connected to the plated conductor highway on the card to the exterior electrical wires. On the other hand, it serves as a mechanical support and attachment for mounting the printed circuit board 8 to the panel 100. Usually, both of these functions are achieved simultaneously simply by inserting the board and its attached connector 5 into a corresponding connector that is mounted on the panel 100. Unfortunately, the coupling of the optical fiber or fibers leading from component 6 to a bulkhead connector 2, particularly in a blind fashion, has not been easily accomplished, since the prior art types of fiber connectors are basically cable-to-cable connectors requiring independent and careful hand manipulation.

In copending patent application Ser. No. 134,225, filed Mar. 26, 1980 entitled "Signal Fiber Connector For Pluggable Card For Module Optical Interconnections", by C. Hillegonds et al, now U.S. Pat. No. 4,406,514, issued Sept. 27, 1983 and assigned to the assignee of the present application, the shortcomings of prior art types of optical fiber connectors are discussed and an improved optical fiber connector for a pluggable card that forms the subject matter of that application is described. With the configuration described in the above copending application, an optical fiber connector configuration includes a connector socket which may be mounted on a printed circuit board or optical module and a connector pin which is attached to a panel by way of which the printed circuit board or module is to be supported. In order to provide automatic guidance of the fibers together, a bracket is mounted on the printed circuit card for holding the connector socket. The bracket is dimensionally positioned relative to the end of the card so that when the card is mounted on the panel through associated hardware, the optical fiber connector and socket will be properly dimensionally located for alignment in fiber coupling. The bracket includes an aperture through which the socket passes and which is of a larger internal diameter than the outside diameter of the socket. The socket is retained in the aperture of the bracket through a compression spring that is preferably seated in a recess in the bracket surrounding the aperture and abuts against a ring held in annular groove in the socket. The spring urges the socket in the direction of the pin to which it is to be joined and cooperates with a section of the socket of wider diameter than the aperture and the ring to hold the socket on the bracket while permitting the male end of the socket to be displaced relative to the axis of the board in the bulkhead mounted pin, thereby assuring a small amount of play between the socket and the axis of the aperture in the bracket, so that a blind fitting of the connector socket and connector pin may be achieved.

While this type of blind rack and panel optical fiber connector provides a certain amount of displacement of the connector socket and the pin relative to each other, so as to assist in the blind mating of the two elements, it has been found that because of the manner in which the socket is mounted in the printed circuit card bracket and is pivotally displaceable by virtue of the aperture in the mounting and a bias spring coupled to the socket and seated in the mounting, the type of displacement that is effectively offered during the blind mating is an angular displacement of the socket, so that the axis of the socket and the axis of the connector pin are not ideally parallel with one another when the two come to be joined together. Since the final objective of any fiber optic connector mounting is to achieve a true face to face abutment of the ends of the fiber strands being mated, the coaxial joining of such fibers is an absolute necessity.

SUMMARY OF THE INVENTION

Applicants have found that for achieving this objective it is preferred that the displacement that is offered by the rack and panel connector arrangement be one which provides a certain amount of play between the socket and the pin but which insures that the play is essentially confined to a lateral translation, namely, one which is transverse to the axis of the fiber optic pins, in order to insure that when the socket and connector portions of the mounting arrangement are joined together, the urging of the fiber strands together will follow a course in which there is no angular offset between the ends of the fiber containing pins, thereby avoiding damage to the ends of the pins and assuring a true face-to-face abutment and proper alignment.

Thus, like the fiber optic connector described in the above-referenced copending application, the present invention provides a rack and panel connector that provides a certain amount of play between the socket and the pin to assist in a blind mating of the two when the board is connected to the panel; however, the configuration of the mounting arrangement is such that the play provided is essentially one which translates orthogonal to the axis of the fiber optic pins to be connected, so that the pins are aligned with a closer tolerance than heretofore achieved.

Rather than provide the card portion of the connector with a spring-loaded, angular-play configuration pivoted at the rear of the connector body, as is done in the connector described in the above-referenced application, the present invention provides a connector arrangement wherein the socket is spring loaded from the rear of a housing, mounted either on the printed circuit card or on the hardware chassis, so as to permit only effective translational movement of the pin-receiving end of the socket. The pin may be affixed to the chassis, or the printed circuit card depending on the location of the socket, so that when the pin and the socket are brought together, the axes of the optical fibers retained therein remain substantially parallel with one another and join in a true face-to-face abutment without damage to the ends of the fibers and their surrounding pins.

The present invention also includes a coarse guide pin mounted within a connector mating block which may be associated with a printed circuit board. With this arrangement, the guide pin mates with a guide pin bushing provided in the chassis wall, thereby assisting in an initial nonangular movement of the connectors relative to one another and assisting in the parallel translation, as necessary, of the socket relative to the connector pin. Since the floating part of the connector, e.g. the socket, rides on a Teflon washer face and allows only lateral movement of the socket, there is effectively no or only minimal angular movement during the initial mating of the socket and the pin. Once the two have become initially mated, there is an accurate urging of the fiber optic pins together for extremely low loss abutment within the interior of the pin or jack portion of the rack and panel fiber optic connector.

DETAILED DESCRIPTION OF THE INVENTION

Figure 1:
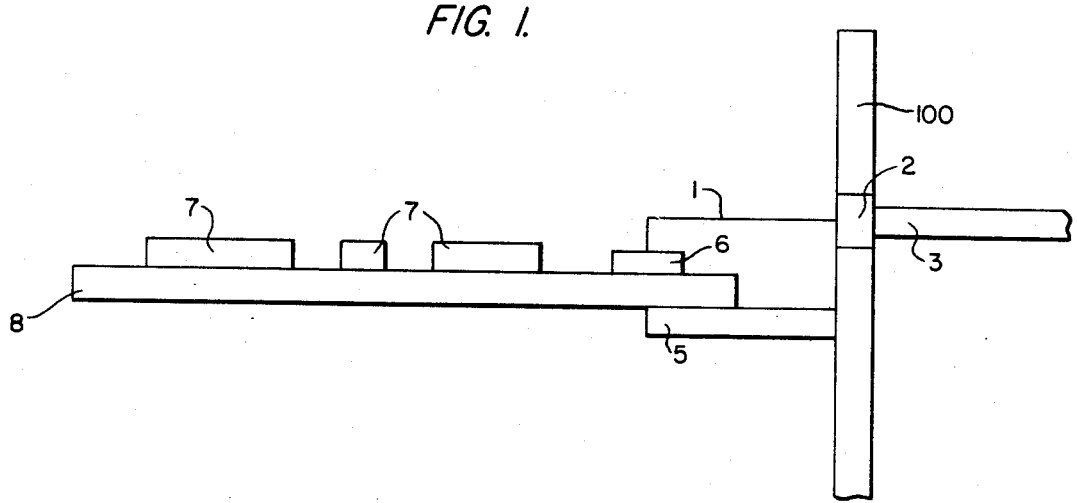
FIG. 1 is a general illustration of the mounting of a printed circuit board containing electro-optic components of a support structure with a coupling fee for an optical fiber.
Figure 2:
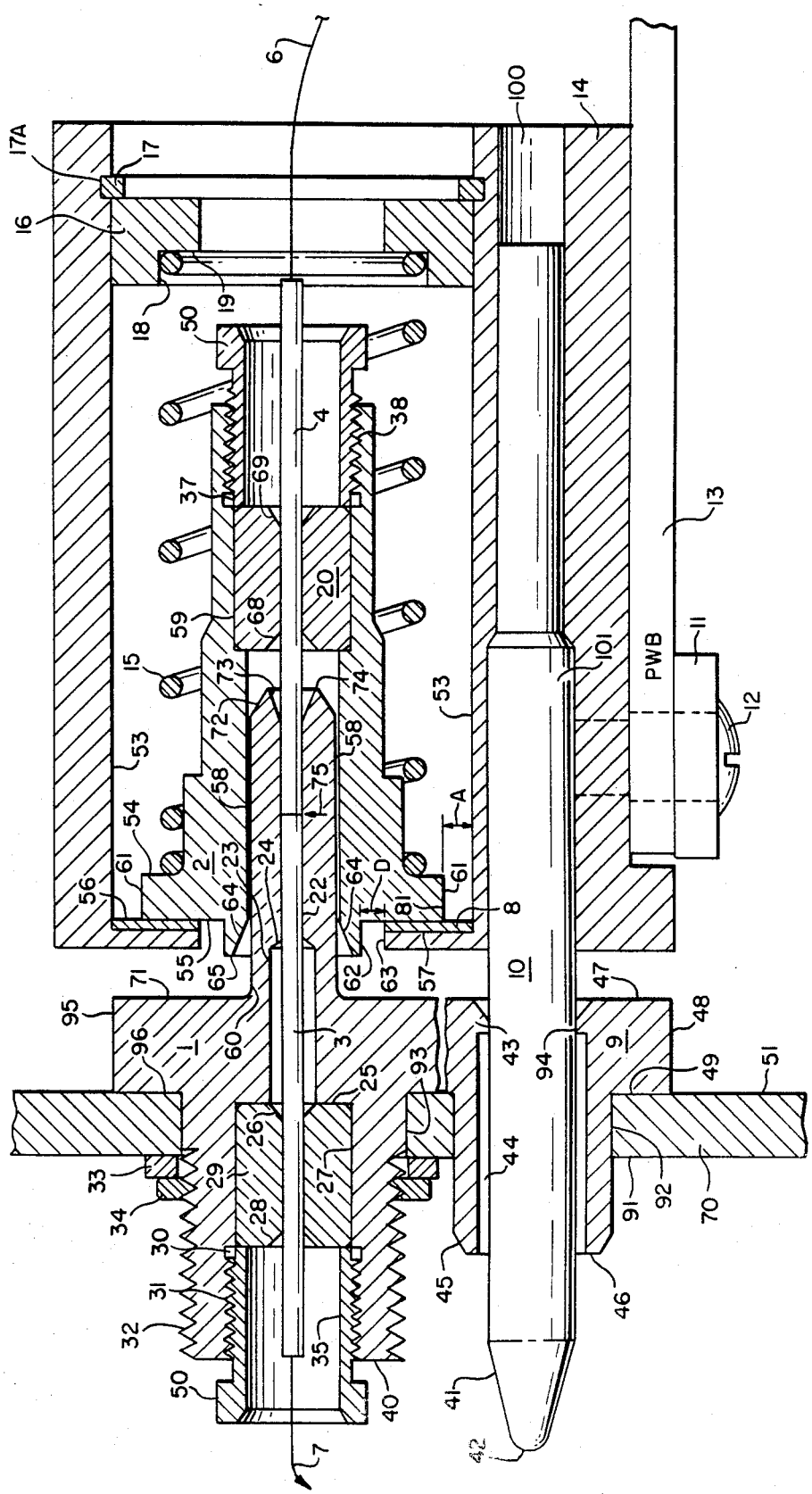
FIG. 2 is a detailed sectional illustration of the optical fiber connector socket-pin assembly of the present invention.

FIG. 2 illustrates the overall assembly of the blind-mating rack and panel optical fiber connector in accordance with the present invention. In accordance with the illustrated embodiment, the fixed male portion of the connector is rigidly fixed to a hardware chassis while a translatable female portion of the connector is supported in a housing or connector block that is affixed to a printed circuit card to be supported by the chassis. It should be understood, however, that the location of the male and female portions of the connector may be reversed form their positions shown in FIG. 2 without departing from the scope of the present invention. At the left hand side of the figure is shown a chassis panel 70 having a front surface 51 which faces the side from which a printed circuit board is received and a rear surface 91 for external communication port connections. The chassis is provided with a pair of circular apertures 92 and 93 which respectively receive a guide pin bushing 9 and one or more bulkhead jacks 1. The guide pin bushing 9 has effectively a T-shaped cross section with a wide portion of the T having a front surface 47 and a side surface 48. The bottom surface of the T 49 abuts against the front surface 51 of the chassis while the cylindrical narrow portion of the bushing fits snugly within aperture 92 of chassis 70. A cut out cylindrical portion 44 is provided within the cylindrical stem of the guide pin bushing 9 in order to provide a cylindrical cavity permitting a certain amount of angular pivoting of the guide pin 10 during its insertion into the guide pin bushing 9. The left handward most side or end of the guide pin bushing 9 has a tapered surface 45 terminating at land portion 46 to facilitate insertion of the guide pin bushing into the aperture 92 of the chassis 70. The forward or front end of the guide pin bushing 9 has a tapered surface 43 extending from the front surface 47 to the aperture 94 to assist in guiding the front end of the guide pin 10, specifically at a front rounded off surface 42 and a tapered surface 41, during insertion of the guide pin 10 into the bushing 9.

The guide pin 10 is preferably of circular configuration to assist in mating with the guide pin bushing 9. The guide pin 10 is affixed within a wide cavity portion 101 of a cavity 100 within a connector mating block 14. The connector mating block 14 is mounted on a printed circuit 13 containing opto-electronic, electro-optic components, printed circuit components, etc. by way of one or more screws 12 and associated washer 11. The guide pin 10 and associated guide pin bushing 9 cooperate with one another to provide a coarse blind mating of printed circuit board/fiber optic connector and the chassis panel where the two are to be joined together. Again, as is the case with the male and female portions of the fiber connectors proper, the location of the male and female portions of the coarse alignment arrangement comprising guide pin 10 and guide pin bushing 9 may be reversed without departing from the present invention. Namely, the guide pin bushing 9 may be provided in an aperture in connector block 14 while guide pin 10 may be affixed to chassis 70. For purposes of the present description the bushing 9 is preferably attached to chassis 70, while the guide pin 10 is affixed to the connector block 14.

The optical fibers themselves, namely a first optical fiber 6 that is coupled to a component on the printed circuit board 13 and is to be joined with another optical fiber 7 extending through the chassis panel, are surrounded by protective stainless steel tubing sleeves 4 and 3, respectively, the ends of which are finely polished and contiguous with the ends of the protective sleeves 4 and 3, to join together within a bore 22 of bulkhead jack 1 at a position designated by arrow 75.

Bulkhead jack 1, which corresponds to the male portion of the connection, is preferably made of stainless steel and has an outer threaded cylindrical surface 32 which fits somewhat snugly in circular aperture 93 of the chassis panel 70. This threaded portion 32 may receive a washer 33 and an interiorly threaded nut 34. When the nut 34 is tightened against the washer 33, the surface 96 of the bulkhead jack 1 is urged in frictional contact with the front face 51 of the chassis panel, so that the bulkhead jack 1 is rigidly affixed to the chassis panel 70. The diameter of the outer surface 95 of the bulkhead jack is wide enough to provide sufficient contact between surface 96 and chassis panel 70 for a firm hold within the aperture 93. As shown in the drawing, the outer diameters 48 of guide pin bushing 9 and 95 of bulkhead jack 1 appear to overlap one another; however, the two are not positioned such that there is mutual overlap, but are preferably offset with respect to one another, so that bulkhead jack 1 and the guide pin bushing 9 do not contact one another. In this regard it should be noted that although only a single bulkhead jack 1 and an associated connector plug 2 are illustrated in FIG. 2, it should be understood that in accordance with the present invention it is intended that more than a single jack-plug arrangement may be provided. Namely, connector block 14 may house one or a plurality of connector plugs 2 (or conversely jacks 1 where the location of the components are to be reversed from that shown in the drawings) and chassis 70 may support one or a plurality of bulkhead jacks 1. In the multiple jack-plug configuration the coarse alignment guide pin-bushing arrangement is offset vertically from the jack-plug arrangement to facilitate a compact arrangement. Accordingly, the broken separation between the two is shown on the drawing so as to simplify the illustration in a single figure.

The interior of the bulkhead jack 1 includes a threaded bore portion 31 which extends from a rear surface 40 and terminates in a circular hollow interior portion 27 of slightly smaller diameter than the threaded portion 31. Extending from an end wall 25 of the circular hollow interior portion 27 is a further reduced diameter cylindrical bore portion 23 from which extends a still further reduced diameter circular bore portion 22. Circular bore portion 22 is machined to an extremely fine tolerance to permit the fiber optic pins 3 and 4 to snugly extend therethrough. The forward end of the bulkhead jack 1 terminates at a land portion 74. Extending exteriorly to the outer surface of the bulkhead jack 1 from the land surface portion 74 is a tapered section 72. Tapered section 72 is essentially conical and will cooperate with the interiorly tapered portion 64 of the connector plug 2 or female portion of the connector arrangement for assisting in joining the two components together. The tapered interior portion 73 of the bulkhead jack extends from the end 74 thereof to the precisely machined circular interior bore 22. Tapered surface 73 facilitates insertion of the fiber optic protection sleeves 4 during the joining of the male and female portions, namely the bulkhead jack 1 and the connector plug 2 together.

Within the circular interior hollow bore portion 27 of the bulkhead jack 1 there is provided a bushing 29 that is employed as a retaining element for connector pin 3. Bushing 29 is sized to substantially fill hollow bore portion 27 and has a central hollow portion that fits snugly around the outer cylindrical surface of connector pin 3. Tapered portions 26 and 28 are provided to facilitate the injection or insertion of a suitable adhesive such as an epoxy, for securing the bushing 29 to connector pin 3.

Threaded into the outer end of the bulkhead jack 1 is a retaining nut 50 having an interior hollow cylindrical portion 35, and an outer threaded cylindrical portion which engages the threaded interior portion 31 of the bulkhead jack, so that the retaining nut 50 may be firmly held thereby. The retaining nut 50 has a short cylindrical exterior portion 30 devoid of threads and having a diameter smaller than the outer diameter of bushing 29, so as provide a secure engagement between the retaining nut 50 and bushing 29 and thereby ensure that bushing 29 is held within circular hollow portion 27 and thereby connector pin 3 is securely retained by bulkhead jack 1.

The configuration of the cable that contains the fiber optic strand 7 and with which the protection sleeve or pin 3 engages will not be described here since there are a number of commercially available such cables and a description of the same is not only not necessary for an understanding of the present invention but by omitting an illustration of the same in the figure the drawings are considerably simplified. Suffice it to say that the retaining nut 50 engages such a cable and securely affixes an end of the cable containing the connector pin 3 and the fiber optics strand 7 within the bulkhead jack 1.

The female portion of the rack and panel fiber optic connector is comprised of a stainless steel connector plug 2 which is retained within the connector mating block 14 and which includes an interior hollow bore 58 which is to engage the exterior cylindrical surface 60 of the forward end of bulkhead jack 1.

The connector plug 2 itself has a front face 65 from which extends a tapered interior surface 64 to the interior hollow portion 58. The length of the interior hollow portion 58 is such as to accommodate the forward extension of the bulkhead jack 1, so as to permit the fiber optic strands and protective sleeves to engage one another in an area of the arrow 75, as mentioned previously.

From the front face 65 of the connector plug 2 there extends an outer cylindrical land surface portion 62 of a diameter less than that of the interior cylindrical surface of aperture 63 in the connector mating block 14. From surface portion 62 there extends a flat land area 55 terminating at a rounded corner portion 81 from which there extends a wider diameter outer cylindrical face 61. The diameter of outer cylindrical face 61, which is the widest diameter of any portion on the connector plug 2 is less than that of the width of the interior hollow chamber 53 of the connector mating block 14. As a result, there is permitted a certain amount of lateral play relative to the axis of aperture 63, within a tolerance D as shown. Also, there is a certain amount of play as a tolerance A between the outer cylindrical surface 61 of the connector plug and the interior chamber 53 of the connector mating block 14.

From outer cylindrical surface 61 of the connector plug there extends a face 54 that engages one end of a compression spring 15. Compression spring 15 is a cylindrical compression spring the axis of which is coincident with the axis of the interior of the connector plug 2 and the other end of which abuts against a face 19 and engages a surface 18 of a washer spring retainer 16. Washer spring retainer 16 has an outer dimension corresponding to that of the inner chamber 53 of the connector mating block 14 and is held in place by a lock ring 17 which snaps into a slot 17A within the connector mating block 14. The compression spring 15 is urged against face 19 of the washer spring retainer and face 54 of the connector plug 2, so as to urge the connector plug 2 to the left as shown in the drawing, namely towards surface 57 of the interior of the connector mating block 14. A slick surface washer 8, preferably made of Teflon, is disposed between face 55 of the connector plug 2 and the surface 57 of the connector mating block 14. Because of the extremely low coefficient of friction thus attained between the face 55 of the connector plug 2 and the surface 57 of the connector mating block 14, the connector plug 2 may be freely translated in a direction orthogonal to its central axis, namely orthogonal to the axes of the fiber optic strands contained within their protective sleeves 3 and 4. This lateral motion capability of the connector plug 2 readily facilitates the precise alignment and joining of the fiber optic strands when the connector mating block 14 is joined to the chassis 70 by virtue of the guide pin 10 and the guide pin bushing 9.

Like the interior of the bulkhead jack 1, the connector plug 2 includes a bushing 20 disposed within an interior hollow section 59 of wider diameter than the bore 58 which extends towards the rear of the connector plug 2, namely, to the right hand side of the connector plug 2 as shown in the drawing. Likewise, the connector plug 2 is provided with another retaining nut 50 the exterior cylindrical surface of which is threaded and has an unthreaded portion at the forward end thereof to come in contact with bushing 20 at the termination of hollow portion 38 of the connector plug 2, thereby maintaining the bushing 20 in place. The interior bore 58 of the connector plug 2 extends to the wider diameter, hollowed-out portion 59 containing the bushing 20. Like bushing 29, bushing 20 fits snugly around connector pin 4 and has the opposite interior surfaces thereof tapered at portions 68 and 69 to facilitate insertion or injection of adhesive for securing connector pin 4 to the interior of bushing 20. The individual fiber optic strand 6 extends from the end of the connector pin sleeve 4 and is coupled to a suitable opto-electronic or electro-optic circuit component mounted on the printed circuit board 13, proper.

When the printed circuit board 13 is inserted into its mounting connector (not shown) disposed on chassis panel 70, the guide pin 10 is initially urged towards the guide pin bushing 9. By virtue of rounded surface 42 and tapered surface 41 on guide pin 10 and the interior tapered surface 43 of guide pin bushing 9, the guide pin 10 is urged into the circular aperture 94 within the guide pin bushing 9. The wider diameter of the interior hollow 44 of the guide pin bushing 9 permits a slight amount of angular misalignment as the guide pin 10 passes through the aperture 94. This initial coarse guidance is followed by an urging of the bulkhead jack 1 and the connector plug 2 towards one another. The compression spring 15 continuously urges face 55 of the connector plug 2 against the face 56 of the Teflon washer 8. However, it also permits a degree of play D of the connector plug in a lateral direction, namely, in a direction transverse to the axis of fiber optic pins. Since the urging force of the compression spring is to the left as seen in the drawing or toward the forward end 65 of the connector plug 2, then when the forward end 74 of the bulkhead jack 1, especially the surface 72 thereof, comes into contact with the tapered interior surface 64 of the forward end 65 of the connector plug, the connector plug 2 will tend to be urged so as to slide along the surface of the Teflon washer 8, rather than being rocked or pivoted about some fulcrum point which would result in an angular motion relative to the axis of the fiber optic pins. As a result, the axes of the fiber optic pins 3 and 4 remain substantially parallel with one another and, as surface 72 of the bulkhead jack 1 is guided along the surface 64 of the connector plug 2, eventually the forward end of the bulkhead jack 1 enters the interior hollow bore 58 of the connector plug 2 and lateral motion of the connector plug 2 along the surface of the Teflon washer ceases. At this point, the fiber optic pins 3 and 4 are coaxial with one another and the front faces of the connector pins may be guided directly toward one another for abutment at the portion designated by arrow 75. In the event of any misalignment between the axes of the respective fiber optic pins, the interior tapered surface 73 of the forward end of the bulkhead jack 1 causes the highly polished front end of the fiber optic protection sleeve 4 to be guided to the interior precision bore 22 of the bulkhead jack 1. In assisting in this guidance, the circular corner at the front face of pin 4 is slightly rounded off so as to prevent galling of the interior bore 22 of the bulkhead jack 1. With fiber optic pin 4 inserted into bore 22 and in contact with pin 3 at point 75, a precise low-loss abutment of the fiber optic faces has been achieved. Further urging of the connector mating block towards the chassis panel simply slightly compresses spring 15 to a point further than that shown in the drawing, so as to maintain a continuous urging of the connector plug 2 towards the bulkhead jack 1 and thereby insuring continuous face-to-face contact with the forward ends of pins 3 and 4 and thereby the front faces of fiber optic strands 6 and 7.

In addition to the automatic guidance of the bulkhead jack and connector plug by virtue of the guide pin and guide pin bushing as well as the respective configurations of the plug and jack, not only is there provided a blind mating of the fiber optic pins with respect to one another, but the type of mating that is carried out is one which minimizes the opportunity for the fiber optic pins to become angularly offset with respect to one another in a fashion which might prevent proper mating or entailed damage to the fiber optic pins. Since the floating part of the connector is translatable only at the portion thereof, and rides on a teflon face, only lateral movement with no angular movement is permitted until the connector has been mated together. Moreover, it has been found that the rack and panel connector configuration of the present invention substantially reduces optical loss of the fiber of terminations making it an extremely attractive connector for blind rack and panel couplings.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. An optical fiber connector assembly, adapted for use with an optical module unit that is retained by a connector arrangement mounted on a module unit support structure, for joining a first optical fiber associated with said optical module unit in abutting end-to-end relationship with a second optical fiber associated with said module unit support structure comprising:
   a first optical fiber connector subassembly mounted on one of said optical module unit and said module unit support structure so as to be laterally translatable relative to an axis along which said first and second optical fibers are to be joined together, said first subassembly retaining therein said first optical fiber; and
   a second optical fiber connector subassembly mounted on the other of said optical module unit and said module unit support structure, said second subassembly retaining therein said second optical fiber; and wherein
   said one of said optical module unit and said module unit support structure on which said first optical fiber connector subassembly is mounted has a surface extending laterally relative to said axis and includes means, coupled to said first optical fiber connector subassembly, for continuously urging said first optical fiber connector subassembly against said surface prior to end-to-end abutting engagement of said first and second optical fibers and towards said second optical fiber connector subassembly so that as said optical module unit is joined to said module unit support structure, said first subassembly is permitted to undergo a lateral translation along said surface without pivoting relative to said axis, whereby said first and second subassemblies are caused to be connected together and urge said first and second optical fibers into abutting end-to-end relationship.

2. An optical fiber connector assembly according to claim 1, wherein said one of said optical module unit and said module unit support structure includes means, coupled with said continuously urging means, for supporting said first subassembly for connection with said second subassembly while permitting said first subassembly to be displaced in a direction away from said second subassembly mounted on said other of said optical module unit and said module unit support structure.

3. An optical fiber connector assembly according to claim 2, wherein said continuously urging means includes a spring seated against one end of said supporting means and mechanically coupled with said first subassembly for urging said first subassembly against said surface and toward said second subassembly and thereby urging said first subassembly to be laterally translatable along said surface and also urging said first optical fiber retained therein into abutting end-to-end engagement with said second optical fiber retained by said second subassembly.

4. An optical fiber connector assembly according to claim 2, wherein said optical module unit comprises an electronic/optic circuit-containing board having mounted thereon a support block by way of which said first optical fiber connector subassembly is supported, said support block having, as said surface, a relatively low friction surface over which said first subassembly is laterally displaceable.

5. An optical fiber connector assembly according to claim 4, wherein said continuously urging means includes a spring seated against an interior surface of said support block and mechanically coupled with said first subassembly at a position thereof adjacent said relatively low friction surface for urging said first subassembly against said relatively low friction surface and toward said second subassembly and thereby urging said first subassembly to be laterally displaceable along said relatively low friction surface and also urging said first optical fiber retained therein into abutting end-to-end engagement with said second optical fiber retained by said second subassembly.

6. An optical fiber connector assembly according to claim 5, wherein said support block includes a low friction washer mounted therein, said spring urging said first subassembly against said low friction washer.

7. An optical fiber connector assembly according to claim 1, wherein each of said first and second subassemblies includes an interior bore through which a respective one of said optical fibers and a surrounding protection fiber pin snugly extend, with said optical fibers and said pins abutting end-to-end in the interior bore of said second subassembly upon the joining of said first and second subassemblies together.

8. An optical fiber connector assembly according to claim 7, wherein said second subassembly includes a first end section having a tapered outer surface portion extending from an end face thereof, and said first subassembly includes a second end section having a tapered inner surface portion extending from an end face thereof into a hollow bore portion, into which said first optical fiber and surrounding protective pin extend, for receiving the first end section of said second subassembly.

9. An optical fiber connector assembly according to claim 8, wherein said second subassembly further includes a tapered inner surface portion leading from said end face of said first end section to its interior bore, so that upon the joining of said first end section of said second subassembly into the hollow bore portion of the second end section of said first subassembly, said first optical fiber and surrounding protective pin may be guided into the interior bore of said second subassembly so as to abut end-to-end with said second optical fiber therein.

10. An optical fiber connector assembly according to claim 7, wherein said first subassembly includes a connector plug into which an optical fiber terminal connector for said first optical fiber may be inserted and retained thereby, with said first optical fiber extending from the optical fiber terminal connector into the interior bore of said connector plug.

11. An optical fiber connector assembly according to claim 10, wherein said second subassembly includes a bulkhead jack into which an optical fiber terminal connector for said second optical fiber may be inserted and retained thereby, with said second optical fiber extending from the optical fiber terminal connector into the interior bore of said bulkhead jack.

12. An optical fiber connector assembly according to claim 11, wherein said bulkhead jack includes a first end section having a tapered outer surface portion extending from an end face thereof, and said connector plug includes a second end section having a tapered inner surface portion extending from an end face thereof into a hollow bore portion into which said first optical fiber extends for receiving the first end section of said bulkhead jack.

13. An optical fiber connector assembly according to claim 12, wherein said bulkhead jack further includes a tapered inner surface portion leading from said end face of said first end section to said interior bore of said bulkhead jack, so that upon the joining of said first end section of said bulkhead jack into the hollow bore portion of the second end section of said connector plug, said first optical fiber may be guided into the interior bore of said bulkhead jack so as to abut end-to-end with said second optical fiber therein.

14. An optical fiber connector assembly according to claim 13, wherein said optical module unit comprises an electronic/optic circuit-containing board having mounted thereon a connector mating block by way of which said first optical fiber connector subassembly is supported, said connector mating block having an aperture through which said second end section is displaceable.

15. An optical fiber connector assembly according to claim 14, wherein the diameter of the aperture in said connector mating block is larger than the outer diameter of the second end section passing therethrough so as to permit an amount of play between said connector mating block and said connector plug transverse to the axes of said first and second optical fibers.

16. An optical fiber connector assembly according to claim 15, wherein said continuously urging means includes a spring seated against an interior face of said connector mating block and mechanically coupled with said connector plug for urging said connector plug against said surface and toward said bulkhead jack and thereby urging said connector plug to be laterally translatable along said surface and also urging said first optical fiber retained therein into abutting end-to-end engagement with said second optical fiber retained by said bulkhead jack.

17. An optical fiber connector assembly according to claim 13, further comprising a guide pin mounted to said optical module unit, and a guide pin receiving bushing mounted to said support structure for initially guiding the mating of said first and second subassemblies, prior to the connection together of said first and second subassemblies.

18. An optical fiber connector assembly according to claim 17, wherein said optical module unit comprises an electronic/optic circuit-containing board having mounted thereon a connector mating block by way of which said first optical fiber connector subassembly is supported, said connector mating block having an aperture through which said second end section is displaceable.

19. An optical fiber connector assembly according to claim 7, wherein the corners of the abutting faces of said pins are roundedoff to prevent galling of said interior bores during the joining of said first and second subassemblies together.

20. An optical fiber connector assembly according to claim 1, further comprising a guide pin mounted to one of said optical module unit and said module unit support structure, and a guide pin receiving bushing mounted to the other of said optical module unit and said support structure for initially guiding the mating of said first and second subassemblies, prior to the connection together of said first and second subassemblies.

21. An optical fiber connector assembly according to claim 20, wherein each of said first and second subassemblies includes an interior bore through which a respective one of said optical fibers and a surrounding protection fiber pin snugly extend, with said optical fibers and said pins abutting end-to-end in the interior bore of said second subassembly upon the joining of said first and second subassemblies together.

22. An optical fiber connector assembly according to claim 21, wherein said optical module unit comprises an electronic/optic circuit-containing board having mounted thereon a supported block by way of which said first optical fiber connector subassembly is supported, said support block having a relatively low friction surface over which said first subassembly is laterally displaceable.

23. An optical fiber connector assembly according to claim 22, wherein said continuously urging means includes a spring seated against an interior surface of said support block and mechanically coupled with said first subassembly for urging said first subassembly against said surface and toward said second subassembly and thereby urging said first subassembly to be laterally translatable along said surface and also urging said first optical fiber retained therein into abutting end-to-end engagement with said second optical fiber.

24. An optical fiber connector assembly according to claim 23, wherein said support block includes a low friction washer mounted therein, said spring urging said first subassembly against said low friction washer.

25. An optical fiber connector assembly according to claim 20, wherein said guide pin is mounted to said optical module unit and said guide pin receiving bushing is mounted to said module support structure.

26. For use in an optical fiber connector assembly, adapted for use with an optical module unit that is retained by a connector arrangement mounted on a module unit support structure, for joining a first optical fiber associated with said optical module unit in abutting end-to-end relationship with a second optical fiber associated with said module unit support structure, an optical fiber connector subassembly comprising:

first means for retaining therein one of said first and second optical fibers, and second means, adapted to be coupled to one of said optical module unit and said module unit support structure, for supporting said first means so that said first means is laterally translatable relative to an axis along which said first and second optical fibers are to be joined together, and wherein said second means has a surface extending laterally relative to said axis and includes means, coupled to said first means, for continuously urging said first means in the direction of said axis so as to urge said first means against said surface prior to end-to-end abutting engagement of said first and second optical fibers, whereby, during the joining of said optical module unit to said module unit support structure, said first means is permitted to undergo a lateral translation along said surface without pivoting relative to said axis, thereby causing the optical fiber retained thereby to be urged into abutting end-to-end relationship with the other of said first and second optical fibers retained by the other of said optical module unit and said module unit support structure.

27. An optical fiber connector subassembly according to claim 26, wherein said second means includes means, coupled to said continuously urging means, for supporting said first means while permitting said first means to be displaced in a direction away from the other of said optical module unit and said module unit support structure.

28. An optical fiber connector subassembly according to claim 26, wherein said first means comprises a connector plug into which an optical fiber terminal connector for said one of said optical fibers may be inserted and retained thereby, with said one optical fiber extending from the optical fiber terminal connector into an interior bore provided in said connector plug.

29. An optical fiber connector subassembly according to claim 28, wherein said second means comprises a housing for receiving said connector plug therein, said housing having an aperture facing the other of said optical module unit and said module unit support structure through which an end section of said connector plug extends, with the lateral translation of said connector plug occurring along an interior surface of said housing at the portion of said housing in which said aperture is provided.

30. An optical fiber connector subassembly according to claim 29, wherein said continuously urging means comprises a spring seated against an interior face of said housing and being mechanically coupled with said connector plug for urging said connector plug toward said aperture and against said interior surface thereof.

31. An optical fiber connector subassembly according to claim 30, wherein said connector plug includes a flange, of a diameter wider than said aperture, which is urged against said interior surface of said housing in which said aperture is provided by the action of said spring.

32. An optical fiber connector subassembly according to claim 31, wherein said housing includes a low friction washer mounted therein, said spring urging said flange against said low friction washer, with lateral translation of said connector plug occurring at the interface between said flange and said low friction washer.

33. An optical fiber connector subassembly according to claim 26, wherein said second means is coupled to said optical module unit.

34. An optical fiber connector subassembly according to claim 33, further comprising a guide pin mounted to said optical module unit and adapted to be inserted into a bushing provided in said module unit support structure.

* * * * *